United States Patent
Chen et al.

(10) Patent No.: US 9,125,175 B2
(45) Date of Patent: Sep. 1, 2015

(54) METHOD AND APPARATUS FOR TRANSMITTING MBMS SERVICES

(75) Inventors: Yu Chen, Shanghai (CN); He Wang, Shanghai (CN)

(73) Assignee: Alcatel Lucent, Boulogne-Billancourt (FR)

(*) Notice: Subject to any disclaimer, the term of this patent is extended or adjusted under 35 U.S.C. 154(b) by 346 days.

(21) Appl. No.: 13/318,087

(22) PCT Filed: Apr. 29, 2009

(86) PCT No.: PCT/CN2009/000474
§ 371 (c)(1),
(2), (4) Date: Oct. 28, 2011

(87) PCT Pub. No.: WO2010/124423
PCT Pub. Date: Nov. 4, 2010

(65) Prior Publication Data
US 2012/0057604 A1    Mar. 8, 2012

(51) Int. Cl.
 *H04J 3/26*  (2006.01)
 *H04W 72/00*  (2009.01)
 *H04W 4/06*  (2009.01)

(52) U.S. Cl.
 CPC .............. *H04W 72/005* (2013.01); *H04W 4/06* (2013.01)

(58) Field of Classification Search
 USPC .......................................... 370/432; 455/561
 See application file for complete search history.

(56) References Cited

U.S. PATENT DOCUMENTS

| 2003/0152020 | A1* | 8/2003 | Schulze et al. ................ 370/206 |
| 2008/0076359 | A1  | 3/2008 | Charpentier et al. |
| 2009/0046573 | A1* | 2/2009 | Damnjanovic ................ 370/216 |

FOREIGN PATENT DOCUMENTS

| CN | 1764199 A | 4/2006 |
| CN | 1929478 A | 3/2007 |
| CN | 101005338 A | 7/2007 |
| CN | 101053221 A | 10/2007 |
| CN | 101262280 A | 9/2008 |
| CN | 101262635 A | 9/2008 |
| CN | 101355400 A | 1/2009 |
| WO | WO2008023945 A1 | 2/2008 |

OTHER PUBLICATIONS

International Search Report for PCT/CN2009/000474 dated Feb. 11, 2010.
Supplementary European Search Report for corresponding European Application No. 09843835, dated Nov. 17, 2014, 4 pages.
(Continued)

*Primary Examiner* — Wei Zhao
(74) *Attorney, Agent, or Firm* — Fay Sharpe LLP

(57) ABSTRACT

A transmission method for Multicast Broadcast Single Frequency Network (MBSFN) is described, which can realize the multiplexing of Multimedia Broadcast/Multicast Service (MBMS) services with different Modulation and Coding Scheme (MCS)/Service Data Unit (SDU) error rates. The method comprises dividing a plurality of services to be transmitted into multiple service groups according to error rates, each service group including at least one service, and transmitting the plurality of services according to the service groups, wherein the respective services in each service group are transmitted in turn according to a predetermined sequence. In this manner, MBMS services having different MCS/SDU error rates can be multiplexed and transmitted to UEs in the MBSFN.

11 Claims, 3 Drawing Sheets

(56) References Cited

OTHER PUBLICATIONS

Huawei, "MBMS service Multiplexing," 3GPP TSG-RAN WG1 Meeting Ad Hoc LTE, Helsinki, Finland, Jan. 23-25, 2006, Agenda Item: 5.1.2, Document for: Discussion/Decision, R1-060233, 3 pages.

Panasonic, "Multiplexing options for MBMS," 3GPP TSG RAN1 #38bis, Seoul, Korea, Sep. 20-24, 2004, Agenda Item: 5.2, Document for: Discussion and decision, R1-041078, 4 pages.

Alcatel-Lucent Shanghai Bell, Alcatel-Lucent, "Service multiplexing and signalling for eMBMS," 3GPP TSG-RAN WG3 #64, San Francisco, US, May 4-8, 2009, Agenda item: 11.2.1, Document for: Discussion and decision, R3-091301.

* cited by examiner

METHOD AND APPARATUS FOR TRANSMITTING MBMS SERVICES

FIELD OF THE INVENTION

The present invention relates to transmission of MBMS services, and particularly to a method and apparatus for transmitting MBMS services with different MCS/SDU error rates in an LTE system.

BACKGROUND OF THE INVENTION

The current RAN2 has already agreed to multiplex MBMS services in the LTE system, and development has already been carried out for solutions with the same MCS/SDU error rate.

However, there is also a need to multiplex the MBMS services with different MCS/SDU error rates, that is, there are services with different MCS/SDU error rates in a network. Naturally, multiplexing of these services is different from multiplexing of services with a same MCS configuration. Therefore, there is a need to develop a multiplexing solution for MBMS services with different SDU/MCS error rates.

SUMMARY OF THE INVENTION

An object of the present invention is to provide a method and apparatus for transmitting MBMS services, which can perform multiplexing of MBMS services with different MCS/SDU error rates.

An aspect of the present invention is to provide a transmission method for a MBSFN, comprising steps of: dividing a plurality of services to be transmitted into multiple service groups according to error rates, each service group including at least one service; transmitting the plurality of services according to the service groups, wherein the respective services in each service group are transmitted in turn according to a predetermined sequence.

According to an embodiment of the present invention, the step of transmitting the plurality of services according to the service groups comprises: transmitting the plurality of services according to the service groups on a single multicast channel.

According to an embodiment of the present invention, resource blocks for use in transmission of the respective service groups are dynamically allocated.

According to an embodiment of the present invention, the first resource block occupied by the first service of a subsequent service group is continuous with the last resource block occupied by the last service in a previous service group.

According to an embodiment of the present invention, positions of the resource blocks of the services in the respective groups are determined relative to a position dynamically allocated to the first resource block among resource blocks for all the groups.

According to an embodiment of the present invention, resource blocks for use in transmission of the respective service groups are allocated in advance.

According to an embodiment of the present invention, positions of the resource blocks of the services in the respective groups are determined relative to a position allocated in advance to the first resource block among resource blocks for the respective groups.

According to an embodiment of the present invention, the step of transmitting the plurality of services according to the service groups comprises: transmitting corresponding service groups on the respective multicast channels.

According to an embodiment of the present invention, resource blocks for use in transmission of the services in the respective service groups are dynamically allocated.

Another aspect of the present invention provides a transmission apparatus for a MBSFN, comprising: a grouping unit configured to divide a plurality of services to be transmitted into multiple service groups according to error rates, each service group including at least one service; a transmitting unit configured to transmit the plurality of services according to the service groups, wherein the services in each service group are transmitted in turn according to a predetermined sequence.

According to an embodiment of the present invention, the transmitting unit is configured to transmit the plurality of services according to the service groups on a single multicast channel.

According to an embodiment of the present invention, the transmission apparatus further comprises a resource allocating unit configured to dynamically allocate resource blocks used in transmission to the service groups.

According to an embodiment of the present invention, the transmission apparatus comprises a resource allocating unit configured to allocate resource blocks used for transmission to the service groups in advance.

According to an embodiment of the present invention, positions of the resource blocks of the services in the respective groups are determined relative to a position allocated in advance to the first resource block among resource blocks for the respective groups.

According to an embodiment of the present invention, the transmitting unit is configured to transmit corresponding service groups on the respective multicast channels.

According to an embodiment of the present invention, the transmission apparatus comprises a resource allocating unit configured to dynamically allocate resource blocks for use in transmission to the services in the respective service groups.

By using the method and the apparatus. MBMS services having different MCS/SDU error rates can be multiplexed and transmitted to the UEs in the MBSFN.

BRIEF DESCRIPTION OF THE ACCOMPANYING DRAWINGS

The above objects, advantages and features of the present invention will be more apparent by the following detailed description of preferred embodiments with reference to the drawings, wherein.

DETAILED DESCRIPTION OF PREFERRED EMBODIMENTS

Embodiments of the present invention will be described with reference to the drawings. Details and functions unnecessary for the present invention are omitted in the following depictions to prevent them from causing confusion to the understanding of the present invention.

Figure 1:
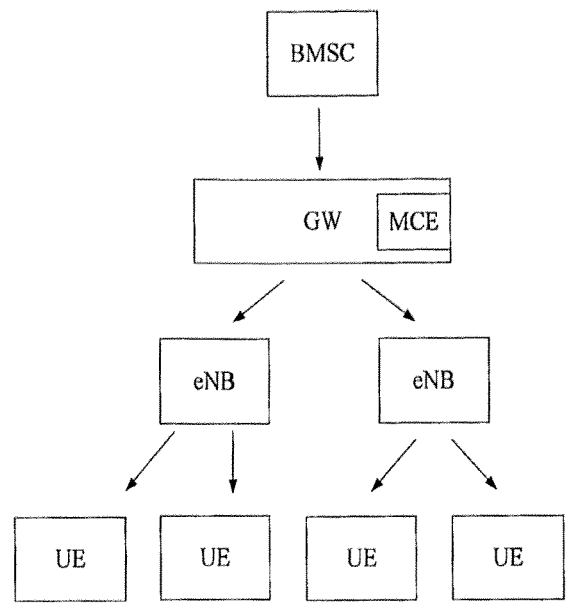
FIG. 1 is a schematic view of a communication system according to an embodiment of the present invention.

FIG. 1 is a schematic view of a communication system according to an embodiment of the present invention. As shown in FIG. 1, data of services to be transmitted is transmitted from a BMSC to a base station eNB via a gateway GW, and then distributed by the base station eNB to user equipment UEs in its cell. In LTE, with regard to the same MBMS services transmission, a single frequency network (SFN) is formed by different adjacent cells for transmitting the MBMS services. The single frequency network for transmitting the MBMS services is referred to as MBSFN hereafter.

Figure 2:
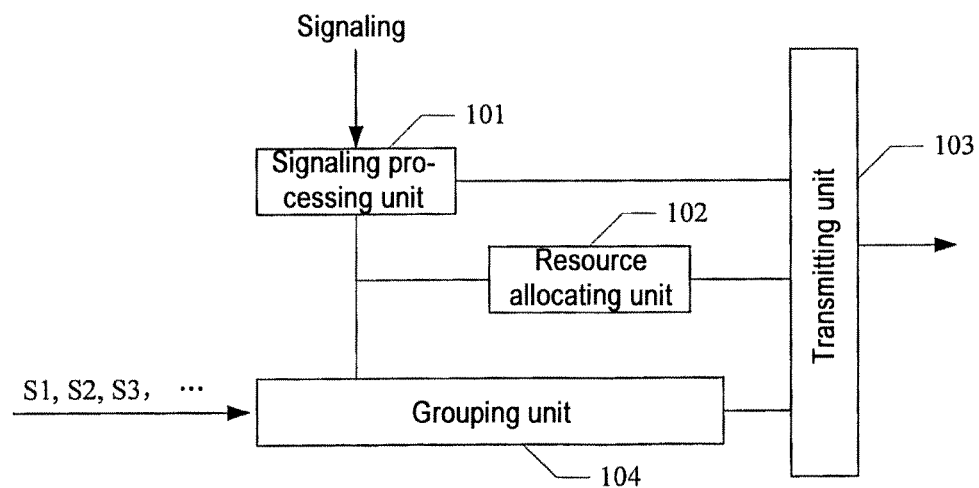
FIG. 2 is a schematic view showing the structure of a transmission apparatus according to an embodiment of the present invention.

FIG. 2 is a schematic view showing the structure of a transmission apparatus according to an embodiment of the present invention.

According to an embodiment of the present invention, services having different SDU error rates are divided into groups and service multiplexing groups are constituted, and then services in a same group are multiplexed dynamically. Thereafter, these services groups are transmitted on different resources in same or different MCHs (multicast channels).

As shown in FIG. 2, the transmission apparatus according to an embodiment of the present invention comprises a signaling processing unit 101 for receiving and processing a signaling from a Multi-cell/multicast Coordination Entity (MCE) such as the MCE of FIG. 1, a grouping unit 104 for grouping services S1, S2, S3, . . . to be transmitted according to the required error rates, a resource allocating unit 102 for allocating resources for service groups and respective services, i.e., allocating corresponding resource blocks to transmit the respective services, and a transmitting unit 103 for transmitting these services on the allocated resources according to the service groups, wherein if there are a plurality of services in one group, the different services may be ranked in the group according to Qos or delay levels or the like.

Figure 3:
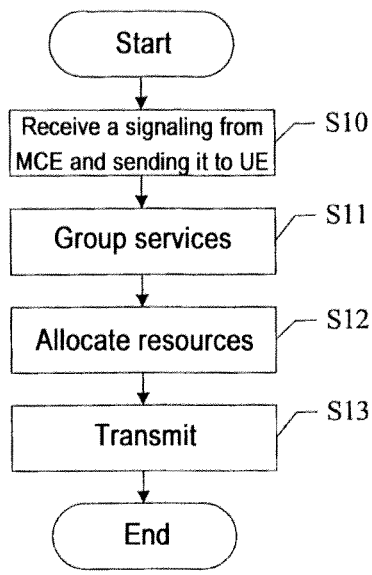
FIG. 3 is a flowchart of a transmission method according to an embodiment of the present invention.

The transmission apparatus and transmission method of the present invention are described in detail with references to FIGS. 3-6. FIG. 3 is a flowchart of a transmission method according to an embodiment of the present invention.

In step S10, the signaling processing unit 101 of the transmission apparatus receives from the MCE a signaling for multiplex transmission of services and a transmission mode, for example, a standard for grouping services according to, such as, SDU error rates, a modulating coding scheme (MCS) for the respective services groups, and a configuration of the multicast channels in the cell.

In step S11, the grouping unit 104 groups services according to the required SDU error rates. For example, there are five services to be multiplexing transmitted, and the five services are divided into a first service group {S1, 32, S4} and a second service group {S3, S5} according to different error rates.

In step S12, the resource allocating unit 102 allocates resource blocks to different service groups and services in the groups according to a resource allocating scheme given in the signaling from the MCE, such as static allocation or dynamic allocation, and sends scheduling information to the UE at the beginning of a scheduling period, so that the UE can know the transmission mode of these services, and positions of the resource blocks used in transmission of the data of the services in a frame or a subframe.

In step S13, the transmitting unit 103 transmits data of the respective services on the allocated resource blocks according to the service groups, wherein services in each of the service groups are transmitted in turn according to a predetermined sequence.

Although the apparatus proposed by the embodiment of the present invention is described in the form of separate function modules as above, each component as shown in the figures can be implemented by a plurality of devices in practical applications, and a plurality of components as shown can be integrated into one chip or one apparatus in practical applications. Even the MCE can be a physical portion or logic portion in a certain base station which can perform functions as described in the embodiments of the present invention. Those having ordinary skill in the art can appreciate that the transmission apparatus and MCE in the embodiment of the present invention can further comprise any units or means for other purposes.

Figure 4:
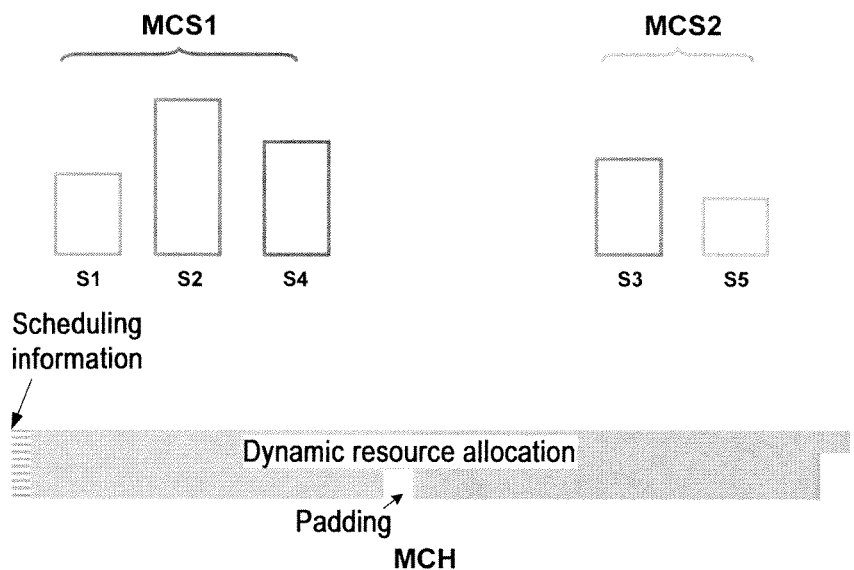
FIG. 4 is a schematic view of a first example of the present invention.

In addition, according to a first example of the present invention, as shown in FIG. 4, a single multicast channel MCH is configured in a cell of a base station, and all the services are transmitted on the resource block of the multicast channel. The grouping unit 104 divides S1-S5 into two groups as above stated according to the SDU error rates. The MCE configures different MCSs for the groups, e.g., MCS1 and MCS2, and sends them to the base station and a UE via the signaling. In the transmission apparatus, the transmitting unit 103 first transmits the first group, wherein the services in the first group are sequentially transmitted, and the first service of the second group is transmitted immediately after the last MAC PDU of the last service of the first group. In other words, the first resource block occupied by the first service of the subsequent service group is continuous with the last resource block occupied by the last service in the previous service group. It can be seen that in the first example, the resource blocks are dynamically allocated. If the data in the group does not fully occupy the MAC PDU, padding will be carried out. Additionally, at the beginning of the transmission, scheduling information is sent to the UE, which indicates that positions of the resource blocks of the respective services are determined relative to a position of the first resource block in a scheduling period. In the case of the example, if the first group occupies resource blocks #1-#100, the transmission of the second group begins with resource block #101. As such, a less waste of resources is caused.

Figure 5:
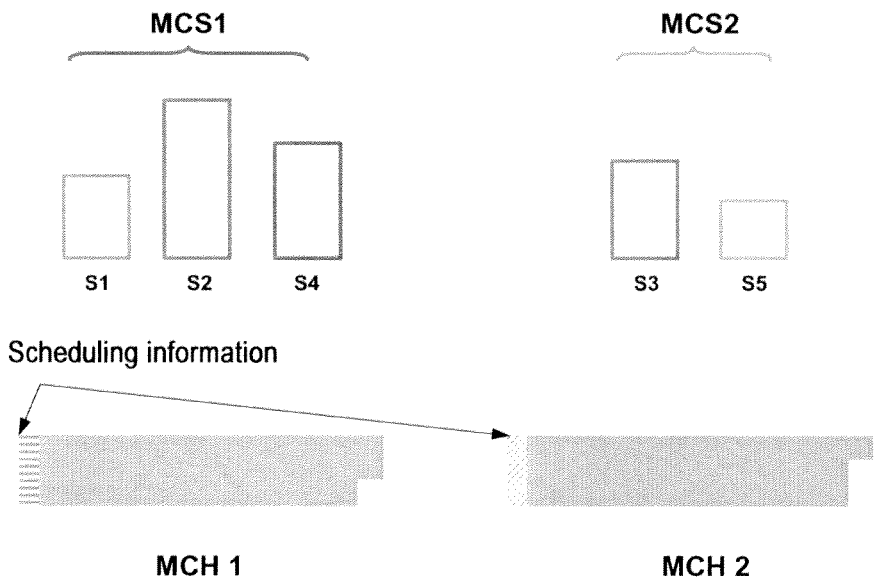
FIG. 5 is a schematic view of a second example of the present invention.

According to a second example of the present invention, as shown in FIG. 5, there are a plurality of MCHs in the cell, and services of the corresponding groups are transmitted on different MCHs. As above stated, the grouping unit 104 groups services according to the SDU error rates. The MCE configures respective MCHs and MCSs for respective groups, e.g., MCH1, MCS1 and MCH2, MCS2. In this case, at the beginning of the session, the NICE transmits to the base station and the UE which group of services will be transmitted on the channels according to the number of the MCH channels. The corresponding service groups are transmitted on the respective MCHs. Dynamic scheduling is carried out in a group. The scheduling information is sent to the base station and the UE via the signaling. If the data in the group does not fully occupy the MAC PDU, padding will be carried out. Additionally, at the beginning of the transmission, scheduling information is sent to the UE, which indicates that positions of the resource blocks of the respective services in the group are determined relative to a position of the first resource block in a scheduling period on the MCH.

Figure 6:
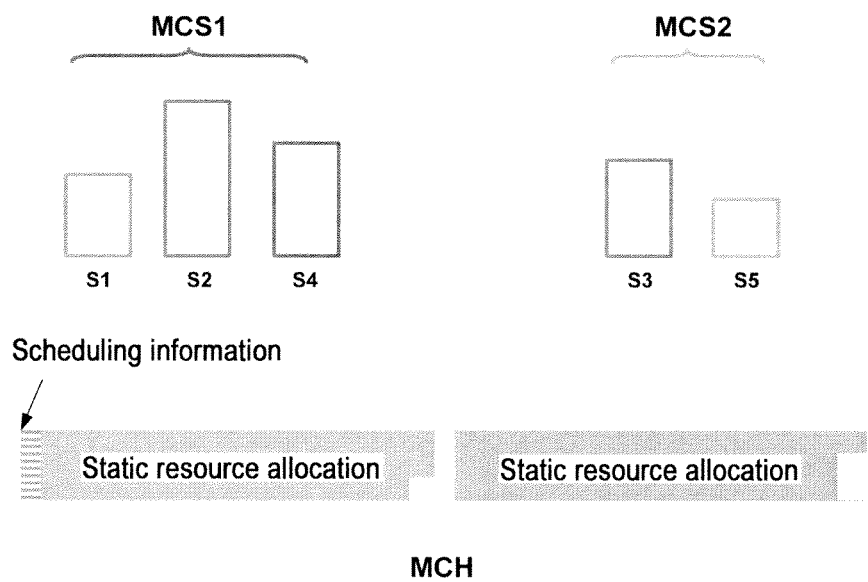
FIG. 6 is a schematic view of a third example of the present invention.

According to a third example of the present invention, as shown in FIG. 6, grouping is carried out according to the SDU error rates, predetermined resource blocks on the MCH are allocated for the groups in advance (i.e., static resource allocation). For example, resource blocks #1-#100 are allocated to the first group, resources blocks #101-#200 are allocated to the second group, and then sent down to the base station and the UE. Even if the services in the first group do not fully occupy the allocated resource blocks, the remaining resource blocks will not be allocated to the second group. The service groups are transmitted on the same MCH, and have their respective MCSs, e.g., MCS1 and MCS2, which are determined by the MCE and sent to the base station and the UE via the signaling. Services are sequentially transmitted and dynamically adjusted in a group. If the data in the group does not fully occupy the MAC PDU, padding will be carried out. Additionally, at the beginning of the transmission, scheduling information is sent to the UE, which indicates that positions of the resource blocks of the respective services in the group are determined relative to a position of the first resource block in a scheduling period on the MCH.

Those skilled in the art may readily appreciate that different steps of the above method may be performed by a programming computer. In this text, some embodiments are intended to cover machine-readable or computer-readable program storage devices (for example, a digital data storage medium), as well as machine-executable or computer-executable instruction program instructions, wherein these instructions perform part or all of the steps of the above method. The program storage medium, for example, may be a digital storage, a magnetic storage medium (such as magnetic diskette and magnetic tape), hardware, or optical readable digital data storage medium. The embodiments also cover a computer programmed to execute steps of the above method.

The above description and figures only illustrate principles of the present invention. Therefore, it should be appreciated that those skilled in the art can propose different structures. Although these different structures are not explicitly described or indicated herein, they reflect the principles of the present invention and are included in the spirit and scope of the present invention. Besides, all the examples mentioned herein are definitely mainly used for teaching purpose and assist readers in understanding the principles of the present invention and concepts conceived by the inventor and promoting progress of the field, and should be interpreted as not limiting these particularly-mentioned examples and conditions. Besides, statements of the principles, aspects and embodiments of the present invention and specific examples thereof as mentioned herein include their equivalents therein.

Words in FIG. 2
101 signaling processing unit
102 resource allocating unit
103 transmitting unit
104 grouping unit
105 signaling
Words in FIG. 3
Start
S10 Receive a signaling from MCE and sending it to UE
S11 Group services
S12 allocate resources
S13 transmit
End
Words in FIG. 4
Scheduling information
Dynamic resource allocation
Padding
Words in FIG. 5
Scheduling information
Words in FIG. 6
Scheduling information
Static resource allocation

What is claimed is:

1. A transmission method for a Multicast Broadcast Single Frequency Network (MBSFN), comprising:
dividing a plurality of services to be transmitted into multiple service groups according to error rates, each service group including at least one service;
transmitting the plurality of services according to the service groups, wherein the respective services in each service group are transmitted in turn according to a predetermined sequence;
wherein resource blocks for use in transmission of the respective service groups are dynamically allocated;
wherein the method is performed in the Multicast Broadcast Single Frequency Network (MBSFN).

2. The transmission method according to claim 1, wherein transmitting the plurality of services according to the service groups comprises:
transmitting the plurality of services according to the service groups on a single multicast channel.

3. The transmission method according to claim 2, wherein the first resource block occupied by the first service of a subsequent service group is continuous with the last resource block occupied by the last service in a previous service group.

4. The transmission method according to claim 2, wherein positions of the resource blocks of the services in the respective groups are determined relative to a position dynamically allocated to the first resource block among resource blocks for all the groups.

5. The transmission method according to claim 2, wherein resource blocks for use in transmission of the respective service groups are allocated in advance.

6. The transmission method according to claim 5, wherein positions of the resource blocks of the services in the respective groups are determined relative to a position allocated in advance to the first resource block among resource blocks for the respective groups.

7. The transmission method according to claim 1, wherein transmitting the plurality of services according to the service groups comprises: transmitting corresponding service groups on respective multicast channels.

8. A transmission apparatus for a Multicast Broadcast Single Frequency Network (MBSFN), comprising:
a grouping unit, configured to divide a plurality of services to be transmitted into multiple service groups according to error rates, each service group including at least one service;
a transmitting unit, configured to transmit the plurality of services according to the service groups, wherein the services in each service group are transmitted in turn according to a predetermined sequence; and
a resource allocating unit configured to dynamically allocate resource blocks used in transmission of the respective service groups;
wherein the transmission apparatus is employed in the Multicast Broadcast Single Frequency Network (MBSFN).

9. The transmission apparatus according to claim 8, wherein the transmitting unit is configured to transmit the plurality of services according to the service groups on a single multicast channel.

10. The transmission apparatus according to claim 9, further comprising a resource allocating unit configured to allocate in advance resource blocks for use in transmission to the respective service groups.

11. The transmission apparatus according to claim 8, wherein the transmitting unit is configured to transmit corresponding service groups on respective multicast channels.

* * * * *